No. 798,361. PATENTED AUG. 29, 1905.
R. MORTON.
MACHINE FOR DIVIDING DOUGH OR LIKE PLASTIC MATERIAL.
APPLICATION FILED JAN. 18, 1904.

WITNESSES.
L. E. Flanders
T. B. Longstaff

INVENTOR.
Robert Morton

UNITED STATES PATENT OFFICE.

ROBERT MORTON, OF DETROIT, MICHIGAN.

MACHINE FOR DIVIDING DOUGH OR LIKE PLASTIC MATERIAL.

No. 798,361. Specification of Letters Patent. Patented Aug. 29, 1905.

Application filed January 18, 1904. Serial No. 189,507.

*To all whom it may concern:*

Be it known that I, ROBERT MORTON, a citizen of the United States of America, residing at Detroit, in the county of Wayne and State of Michigan, have invented certain new and useful Improvements in Machines for Dividing Dough or Like Plastic Material, of which the following is a specification, reference being had therein to the accompanying drawings.

This invention relates to new and useful improvements in machines for dividing dough or like plastic material, and refers more particularly to the means for feeding the dough to the dividing mechanism and to the means for lubricating said mechanism to prevent the dough from sticking thereto. Heretofore in machines of this character the dough has been fed to the cutting-off mechanism by mechanical means, preferably a screw-feed, and I have found from experience that in so doing the air or carbonic-gas cells contained in the dough are broken up by reason of the cutting up or churning of the dough, thereby destroying the quality of the bread, besides being unable to maintain a uniform pressure upon the dough; and it is the object of my invention to uniformly feed the dough by means of compressed air or the like acting directly upon the dough in a closed chamber.

To this end the invention consists in the employment of compressed air or gas for feeding the dough, the means for lubricating the plungers, and in the peculiar construction, arrangement, and combination of parts, all as more fully hereinafter described, and shown in the accompanying drawings, in which—

Figure 1:
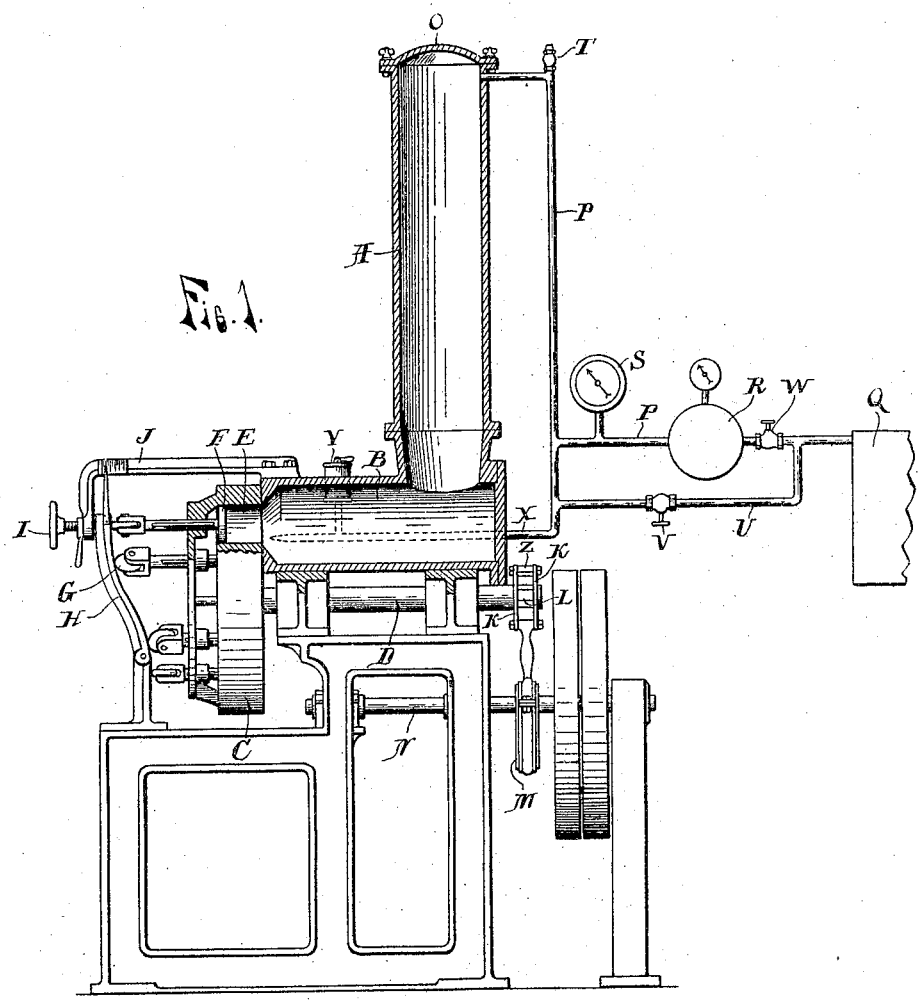
Figure 2:
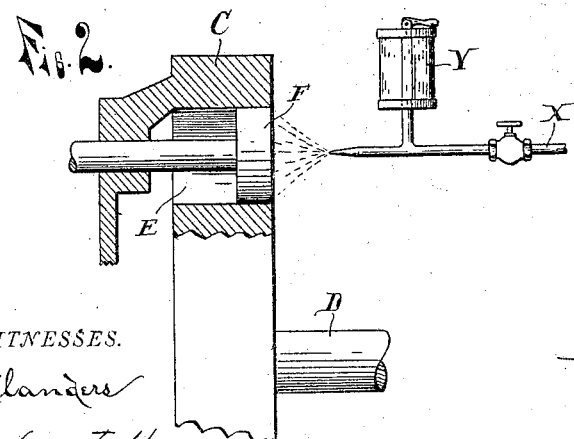

Figure 1 is a side elevation of the machine, partly in section; Fig. 2, a section through the mold-disk, showing means for lubricating the plungers.

A is the hopper, into which the dough is fed; B, the horizontal feed-cylinder, forming a continuation of the vertical hopper.

C is the mold-disk, mounted on a shaft D and provided with any convenient number of molds or pockets E, each fitted with a sliding piston F, the piston-rods of which at their outer ends carry the antifriction-rolls G, adapted to travel upon the adjustable circular track or way H. This track or way is divided at or near its middle into a lower stationary section secured to the frame and an upper movable section pivotally mounted at its lower end on the stationary section, while its upper end is adjusted and held by a hand-screw I, passing through the depending end of the bar J, secured to the frame or casing. By adjusting the hand-screw I in accordance with the graduations on the bar J the volume of the dough or plastic material admitted in the mold or pocket E is determined.

The mold-disk C is revolved intermittently by a pawl Z, pivoted on two cheek-plates K, revolving loosely on the shaft D, the pawl engaging with a ratchet-wheel L, which has as many teeth as there are pockets in the disk C, keyed on the shaft D, and the cheek-plates K are operated by the eccentric M, keyed on the drive-shaft N. The mold-disk C thus remains quite stationary while the mold or pocket is receiving the charge of dough or plastic material while the pawl Z is making its return stroke and is moved rapidly forward for the presentation of the next pocket or mold to the mouth of the feed-cylinder.

The hopper A is provided with a detachable cover O for the admission of the dough and a valve-controlled air-inlet pipe P, connected with a storage-tank Q or other source of supply of compressed air in which the air is maintained at a relatively high pressure, the sides of the hopper being lubricated and the air preferably admitted on top of the dough without the intervention of a plunger or piston, so that there is no danger of breaking up the air-cells in the dough.

R is a pressure-regulator or reducing-valve of any well-known make in the pipe P, and S is a pressure-gage interposed between the pressure-regulator and cylinder, a suitable safety-valve T being also provided in the pipe P.

U is a by-pass provided with a valve V to be used in case the pressure-regulator should become inoperative, and W is a shut-off valve in the pipe P.

X is a pipe connected with the source of air-supply under pressure and provided with an oil-cup Y, communicating therewith, and a spray-nozzle projecting in proximity to said mold-disk, so that as each pocket passes the nozzle it will receive a spray of oil just before receiving its next charge, so that the dough will not adhere thereto in the rapid manipulation of the machine in discharging, a suitable valve being provided in said pipe for regulating the air-pressure and, if desired, may be connected with the actuating mechanism or mold-disk in any well-known manner to intermittently spray the pockets as each is presented. However, where the machine is arranged to operate continuously I preferably have the oil-spray constant, and, if desired, a thick lubricant may be used instead of oil, which may be fed in the same manner against the faces of the plungers while in their forward position.

Having thus fully described my invention, what I claim is—

1. In a machine for dividing dough or like plastic material, the combination with the casing or receptacle for the dough, of means for applying a fluid-pressure upon the dough to force the dough from the receptacle.

2. In a machine for dividing dough or like plastic material, the combination with the cylinder or casing for the dough, of means for applying a fluid-pressure directly upon the dough to force the dough therefrom.

3. In a machine for dividing dough or like plastic material, the combination of a cylinder forming a receptacle for the dough, having an outlet and connected with a source of fluid-supply under pressure, and means for applying a uniform fluid-pressure directly upon the dough to force the dough therefrom.

4. In a machine for dividing dough or like plastic material the combination with the feed-cylinder and revolving mold-disk, of means for varying the capacity of the molds or pockets and for discharge of contents, and separate means for feeding the dough to the molds at a uniform fluid-pressure applied directly upon the dough.

5. In a machine of the character described, a receptacle for the material to be fed having a discharge-opening, communicating with a revolving mold or pocket, and separate means for applying a fluid-pressure directly upon the material to feed the same into said pocket.

6. In a machine of the character described, a receptacle for the material to be fed having a discharge-opening intermittently communicating with a series of revolving molds or pockets, and separate means for applying a uniform fluid-pressure directly upon the material to be fed.

7. In a machine of the character described, the combination with the feed-cylinder and revolving mold-disk, of means for automatically lubricating the mold-disk and means for applying a fluid-pressure directly on the dough to uniformly feed the dough to the mold-disk.

8. In a machine of the character described, the combination with the feed-cylinder and revolving mold-disk, of means for varying the capacity of the molds or pockets and for discharge of their contents, separate means for feeding the dough to the mold-disk at a uniform fluid-pressure and means for automatically spraying said molds or pockets with a lubricating agent.

9. In a machine of the character described, the combination with the feed-cylinder and revolving mold-disk formed with molds or pockets, of means for varying the capacity of the molds or pockets and for discharge of their contents, separate means for applying a fluid-pressure on the dough to feed the same at a uniform pressure to said molds or pockets and means for lubricating said pockets in advance of their reception of the dough.

10. In a machine of the character described, the combination of a feed-cylinder connected with a source of fluid-supply under pressure, of an intermittently-revolving mold-disk formed with pockets coöperating with said cylinder, plungers in said pockets, an adjustable track or way coöperating with said plungers to vary the capacity of said pockets and for discharge of their contents, and an atomizer connected with a source of fluid-supply under pressure adapted to spray said plungers and pockets with a lubricating agent while empty.

In testimony whereof I affix my signature in presence of two witnesses.

ROBERT MORTON.

Witnesses:
THOMAS G. LONGSTAFF,
OTTO F. BARTHEL.